(12) United States Patent
Mettrick

(10) Patent No.: US 9,830,204 B2
(45) Date of Patent: Nov. 28, 2017

(54) FACILITATING COMMUNICATION BETWEEN SOFTWARE COMPONENTS THAT USE MIDDLEWARE

(71) Applicant: BAE SYSTEMS plc, London (GB)

(72) Inventor: Simon Jonathan Mettrick, New Malden (GB)

(73) Assignee: BAE SYSTEMS plc, London (GB)

( * ) Notice: Subject to any disclaimer, the term of this patent is extended or adjusted under 35 U.S.C. 154(b) by 0 days.

(21) Appl. No.: 15/031,342

(22) PCT Filed: Oct. 22, 2014

(86) PCT No.: PCT/EP2014/072596
§ 371 (c)(1),
(2) Date: Apr. 22, 2016

(87) PCT Pub. No.: WO2015/059165
PCT Pub. Date: Apr. 30, 2015

(65) Prior Publication Data
US 2016/0283291 A1   Sep. 29, 2016

(30) Foreign Application Priority Data

Oct. 22, 2013  (EP) .................................. 13275252
Oct. 22, 2013  (GB) .................................. 1318639.0

(51) Int. Cl.
*G06F 9/54* (2006.01)
*G06F 9/44* (2006.01)

(52) U.S. Cl.
CPC ............. *G06F 9/541* (2013.01); *G06F 8/30* (2013.01)

(58) Field of Classification Search
CPC ........................................................ G06F 8/30
(Continued)

(56) References Cited

U.S. PATENT DOCUMENTS 7,010,609 B1 * 3/2006 Black ..................... G06F 9/546
                                                          709/201
7,849,469 B1 * 12/2010 Michel ................... G06F 8/316
                                                          717/100
(Continued)

FOREIGN PATENT DOCUMENTS

EP       2249249 A1   11/2010
WO    2015059165 A1    4/2015

OTHER PUBLICATIONS

International Search Report and Written Opinion received for Patent Application No. PCT/EP2014/72596 dated Dec. 1, 2014. 12 pages.
(Continued)

*Primary Examiner* — Andy Ho
(74) *Attorney, Agent, or Firm* — Finch & Maloney PLLC

(57) ABSTRACT

A computer-implemented method and system for facilitating communication with a software component (102A) that uses a middleware component (106A) includes receiving (304) data representing an information model (206) of a middleware component, and using the information model data to automatically generate (306, 308) code for a middleware bridge component (108) that, in use, facilitates communication between the software component (102A) that uses the middleware component (106A) and a second software component (102B) that uses a second middleware component (106B).

20 Claims, 4 Drawing Sheets

(58) Field of Classification Search
USPC .......................................................... 717/106
See application file for complete search history.

(56) References Cited

U.S. PATENT DOCUMENTS

| | | | | |
|---|---|---|---|---|
| 2008/0256510 | A1* | 10/2008 | Auerbach | G06F 8/30 717/107 |
| 2009/0036750 | A1* | 2/2009 | Weinstein | G06F 19/322 600/300 |
| 2009/0049116 | A1* | 2/2009 | Ferre | G06F 9/548 709/203 |

OTHER PUBLICATIONS

Extended European Search Report received for EP Patent Application No. 13275252.8 dated May 23, 2014. 12 pages.
Haase, Thomas, "Model-Driven Service Development for A-posteriori Application Integration," ICEBE 2007, IEEE International Conference on e-Business Engineering. pp. 649-656.
International Preliminary Report on Patentability received for Patent Application No. PCT/EP2014/72596 dated May 6, 2016. 9 pages.

* cited by examiner

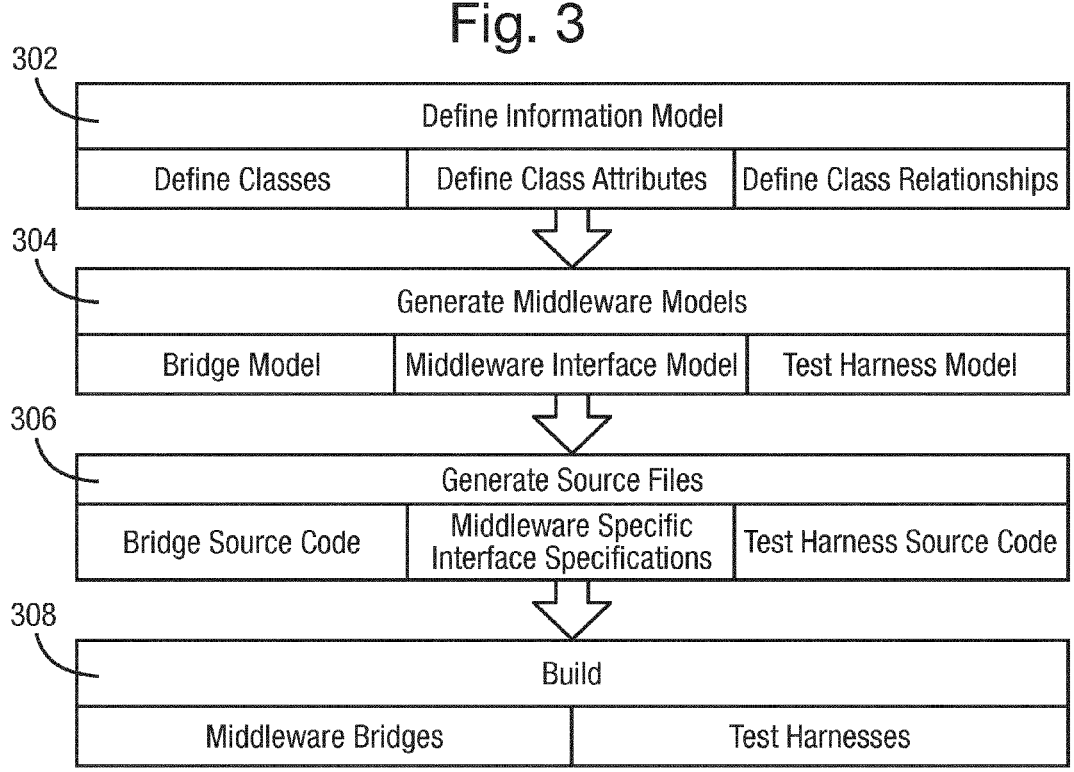
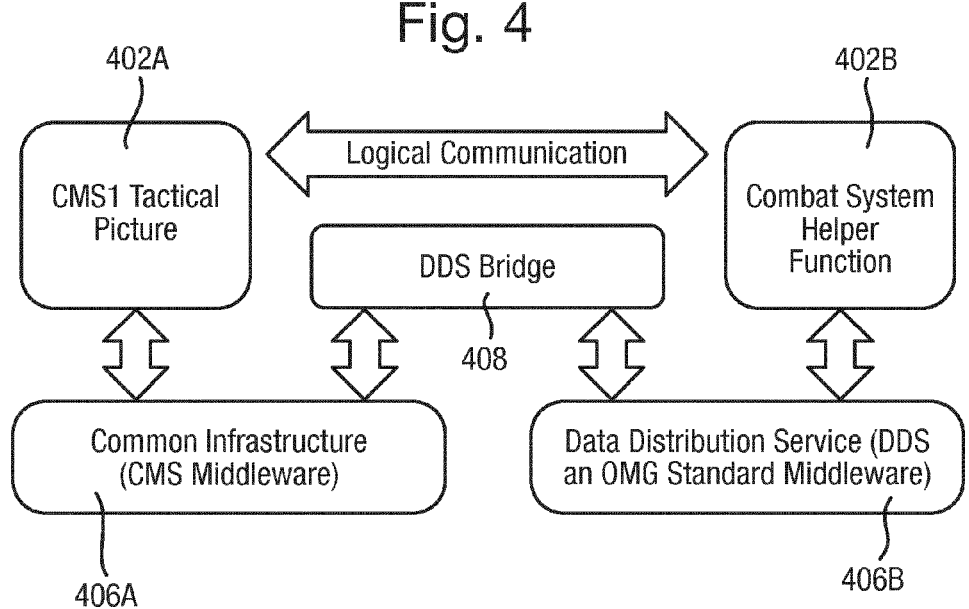

FACILITATING COMMUNICATION BETWEEN SOFTWARE COMPONENTS THAT USE MIDDLEWARE

The present invention relates to facilitating communication between software components that use middleware.

FIG. 1 schematically illustrates a system 100 wherein first 102A and second 102B software components exchange data/logically communicate with each other, as illustrated by arrows 104. The software components can be any program or application and may be executed on the same computing device, or on more than one device in communication over a network. In practice, communication between the software components is achieved via a first middleware component 106A associated with the first software component, and a second middleware component 106B associated with the second software component. The middleware components form an architectural layer above the operating system(s) and below the application components. Typically, the middleware components are configured to mediate between their associated software components and other software (or a network) and can provide services to the software component beyond those available from the operation system of the relevant computing devices.

The two middleware components 106A, 106B can be of different types and unable to communicate directly with each other. A known solution to this situation is for a programmer to manually create a middleware bridge component 108 that can exchange data between the two middleware components. Creating such a bridge component can be time-consuming and complex.

The systems and methods described herein can address at least some of the problems discussed above. The system can provide a tool that automatically generates source code for a software program that will form a bridge between two different middleware technologies. The bridge can extend the communication of information from a set of software components that use one middleware technology to another set of software components that use a different middleware technology. The tool can automatically generate source code using a model of the information that is required to be communicated, with the model being independent of any particular middleware technology.

According to a first aspect of the present invention there is provided a computer-implemented method of facilitating communication with a software component that uses a middleware component, the method including or comprising:

receiving data representing an information model of the middleware component, and using the information model data to automatically generate code for a middleware bridge component that, in use, facilitates communication between the software component that uses the middleware component and a second software component that uses a second middleware component.

The information model may comprise classes used by the middleware component stereotyped as Service Entities. The information model may further comprise other classes packaged into Services. The Service Entities can define primary atomic information that is communicated by each said Service.

The information model may be used to generate the code for the middleware bridge component for each said Service of the information model, wherein the middleware bridge component is configured to receive entities defined for the middleware component and performs format and protocol conversion on the entities to create corresponding entities suitable for use by the second middleware component.

The method may further include generating code required for entry to and exit from the firstmentioned middleware component and the second middleware component.

The method may include replacing and evaluating template placeholders and functions with information from each Service in the information model.

The method may include using at least one software add-in for providing specialist functions that encapsulate particular generation logic for the code.

The method may include abstracting aspects of the middleware bridge component that are independent of the Services.

The information model may be based on UML syntax.

The firstmentioned middleware component may comprise Common Infrastructure used in Combat Management Systems and the second middleware component may comprise Data Distribution Service™. The software component that uses the firstmentioned middleware component may comprise Combat Management Systems and a second software component that uses the Data Distribution Service™ may comprise Combat System Helper Function.

According to other aspects of the present invention there are provided computer program elements comprising: computer code means to make the computer execute methods substantially as described herein. The element may comprise a computer program product.

According to other aspects of the present invention there is provided apparatus including a processor configured to execute methods substantially as described herein.

Whilst the invention has been described above, it extends to any inventive combination of features set out above or in the following description. Although illustrative embodiments of the invention are described in detail herein with reference to the accompanying drawings, it is to be understood that the invention is not limited to these precise embodiments.

Furthermore, it is contemplated that a particular feature described either individually or as part of an embodiment can be combined with other individually described features, or parts of other embodiments, even if the other features and embodiments make no mention of the particular feature. Thus, the invention extends to such specific combinations not already described.

The invention may be performed in various ways, and, by way of example only, embodiments thereof will now be described, reference being made to the accompanying drawings in which:

FIG. 3 is a flowchart illustrating steps performed in relation to use of the example tool;

FIG. 4 is a diagram of the architecture of a specific example system wherein two software components communicate using middleware components.

Figure 2:
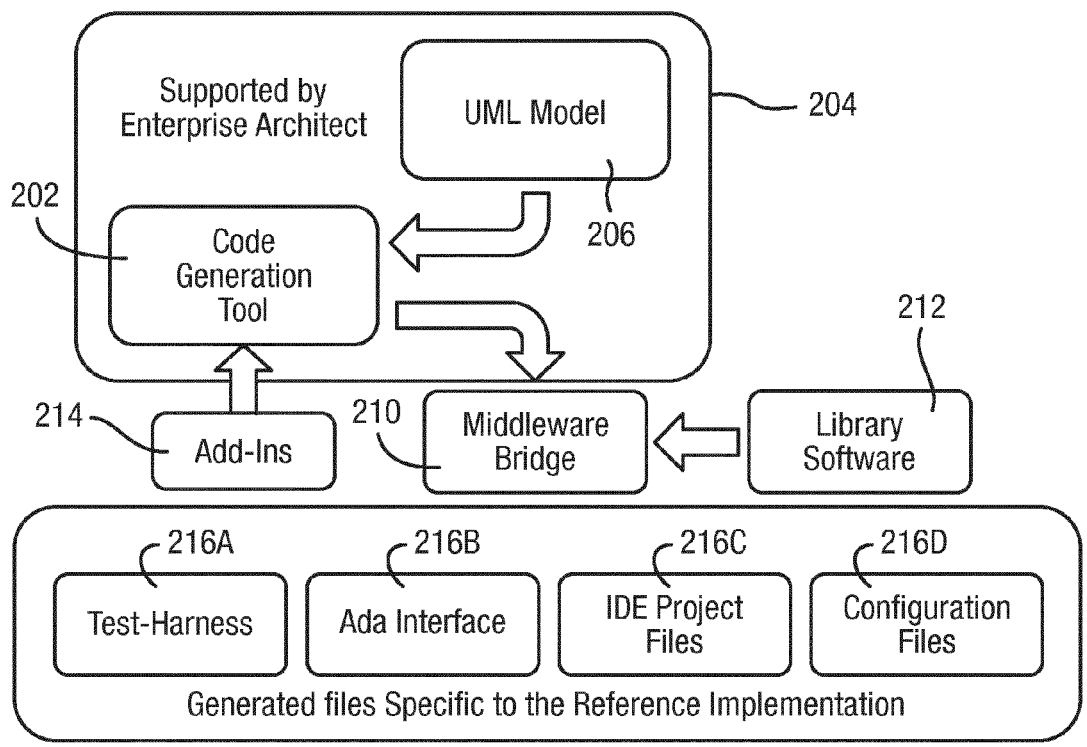
FIG. 2 is a development context architecture diagram including an example tool.

FIG. 2 shows a high level view of components involved in an example system for facilitating communication between software components that use middleware components. In the example embodiment, a tool 202 for generating code that can provide a middleware bridge component is implemented using the Enterprise Architect (EA) modelling tool 204 produced by Sparx Systems Pty Ltd of Victoria, Australia. However, the skilled person will recognise that any tool that supports model transformation and code generation according to Object Management Group's (OMG) model drive architecture (MDA) paradigm could also be employed.

Figure 1:
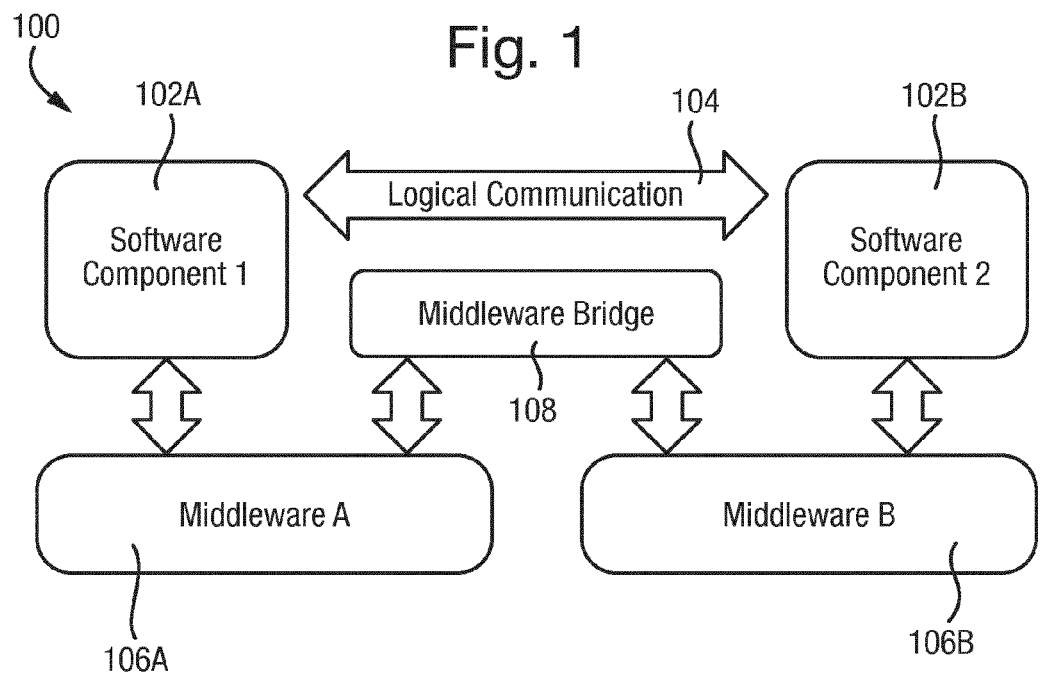
FIG. 1 is a generic diagram of the architecture of a system wherein two software components communicate using middleware components.

The tool 202 can generate code configured to receive entities defined for the interface between components of one middleware component and then perform the necessary format and protocol conversion to create corresponding entities in another middleware component. The tool may also generate code required for entry to and exit from each middleware component's domain. For example, management of the middleware state machine, the declaration or registration of entities with middleware and their subsequent disposal. The tool can be aware of the entities it needs to manipulate, their internal structure and their qualities of service from a model 206 of the information that forms the interface between the software components that use the bridge. In the example, the information model is defined using the syntax of the UML standard, but independently of any terms or constructs particular to a specific middleware technology. In principle, a modelling syntax with a meta-model containing equivalent concepts to aspects of the Unified Modelling Language (UML) can be utilised by embodiments of the present invention. Thus, it is possible to use the same model to define a bridge component 210 (which corresponds to 108 in FIG. 1) between different pairs of middleware technologies and hence such bridges enable one software component to change the middleware that it uses without having an impact on the software components with which it is interfacing. In the example implementation, the tool is implemented using the model transformation and code generation template processing capability of the Enterprise Architect modelling tool, in conjunction with additional library software 212 and one or more software add-ins 214 that extend the template processor.

FIG. 3 shows steps that can be performed in relation to use of the example tool 202. At step 302, the information model 206 is defined according to a meta-model which permits a definition of classes, class attributes and class relationships for a middleware component 106. The reference UML model 206 is an input to the tool 202 for generating the code for the middleware bridge component 210 and contains a set of classes that encapsulate the logical information that is to be passed over the bridge.. The meta-model consists of classes stereotyped 'Service Entities' and other classes all of which are packaged into 'Services'. Service Entities define the primary atomic information that is communicated by each Service. The model can be created by a programmer/user with knowledge of the interface and saved as data in any format which can be read by the tool 202. It is envisaged that the interface being modelled may be based on an existing interface specification, in which case the population of the UML model may be automated.

FIG. 4 is a reference architecture diagram for an example specific implementation of the tool 202 that is configured to generate a middleware bridge component 408 between a first middleware component 406A in the form of CI (Common Infrastructure, a proprietary middleware used in the CMS1 family of Combat Management Systems produced by BAE Systems PLC), and a second middleware component 406B in the form of DDS (Data Distribution Service™, the Object Management Group's (OMG) standard for publish and subscribe middleware). The example implementation is used to interface components that advise on the possible correlations between CMS1's tactical picture 402A (the software component associated with the CI middleware component 406A) and sensor tracks Helper Functions 402B (the software component associated with the DDS middleware component 406B). It will be understood that the Figure relates to one example implementation and other embodiments can be provided to generate an appropriate middleware bridge component for other combinations of software and/or middleware components. For instance, the tool could be configured to produce a middleware bridge component to interface components (Helper Functions) that advise on track identification and classification with CMS1's tactical picture and, another specific embodiment can form a middleware bridge between CI and Web Services.

Figure 5:
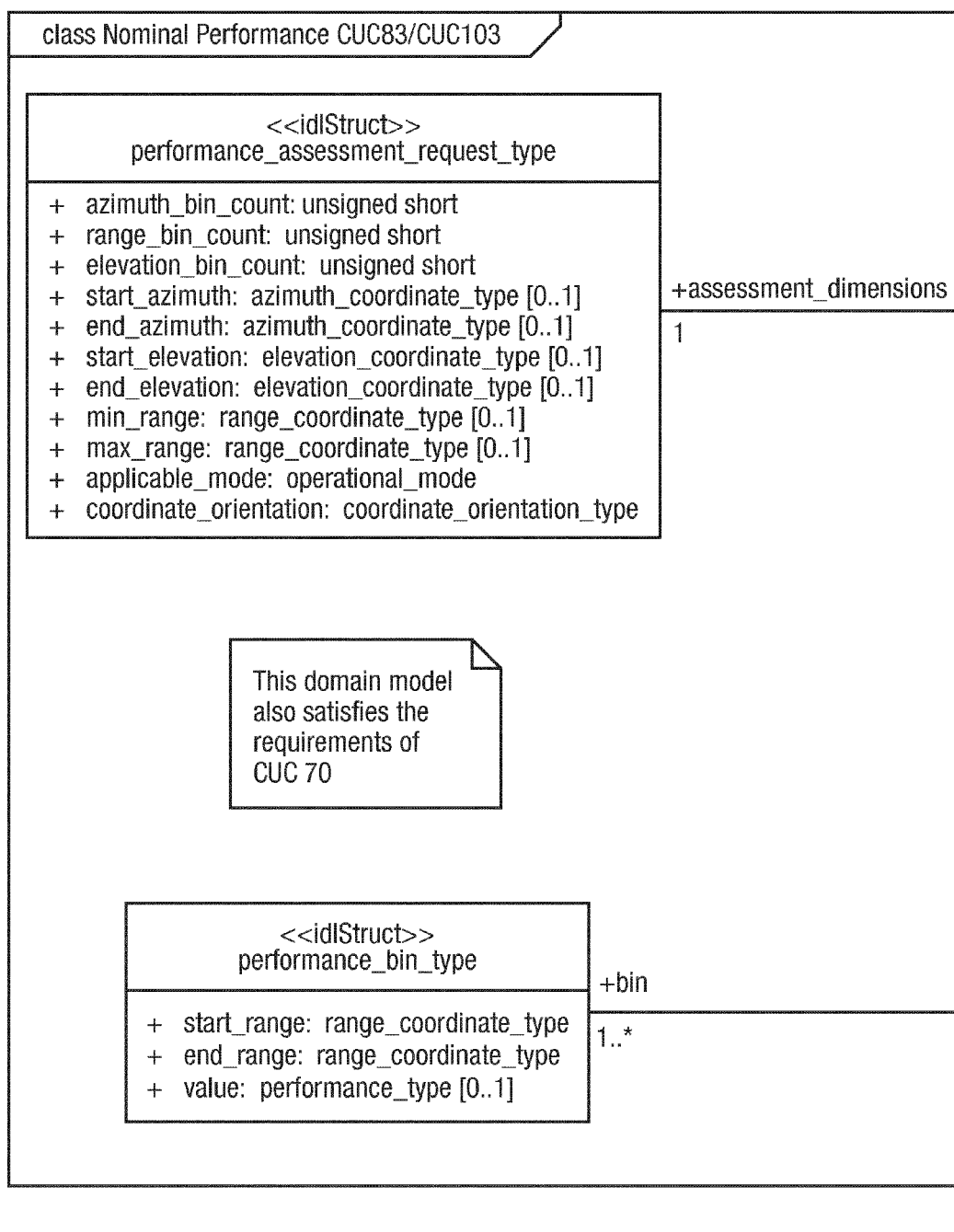
FIG. 5 shows an example information model class diagram used for facilitating communication in the example system of FIG. 4.
Figure 5:
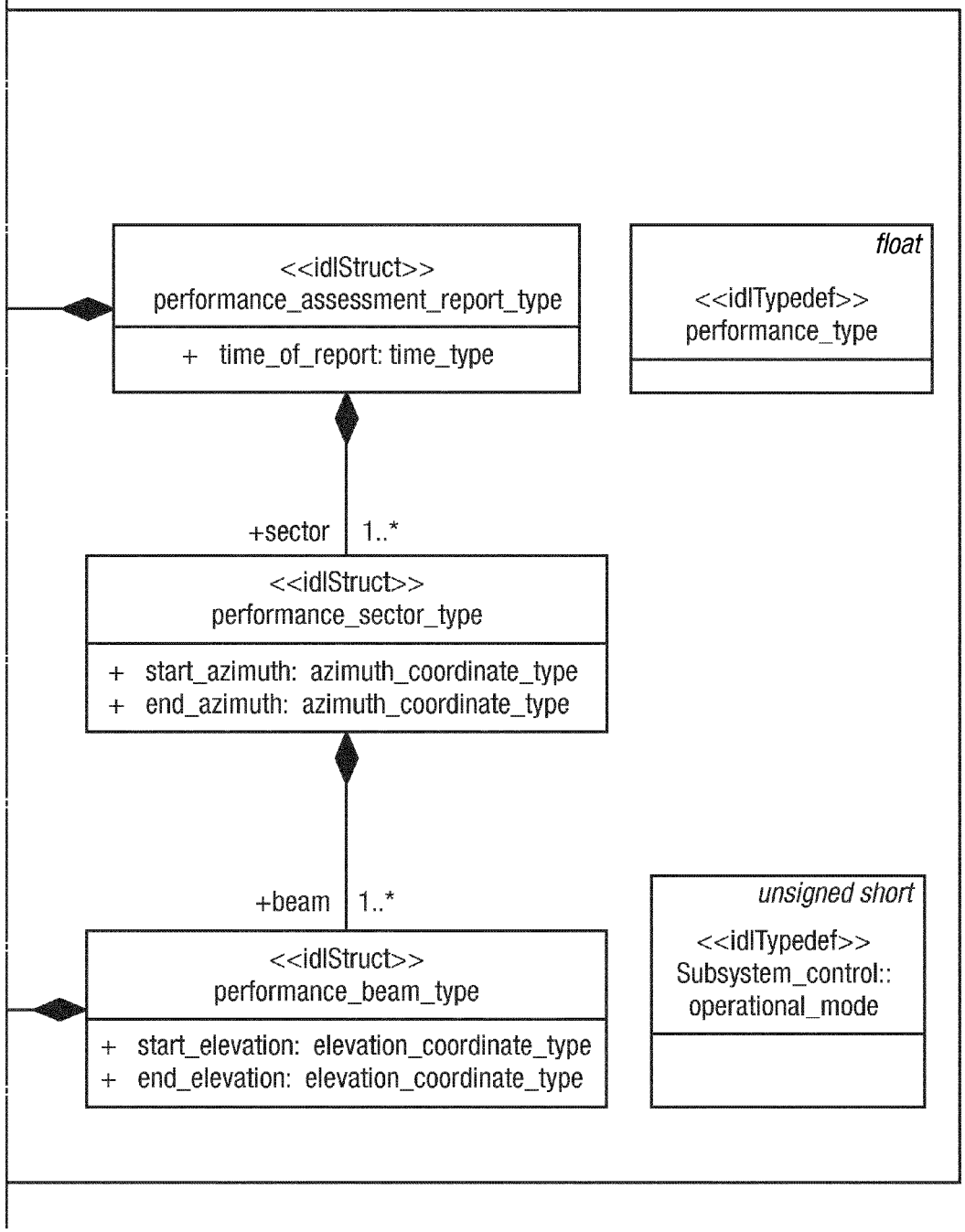

FIG. 5 illustrates a sample class diagram of the model 206 for the example tool 202 that is configured to generate a middleware bridge component between CI 406A and DDS 406B. In the CI, middleware Service Entities correspond to Tables; in DDS they correspond to Topics. The other classes can be used to define the content of the Service Entities using UML class attributes and UML Composition relations. Service Entities may be related using the UML Association relation. Classes may also be related to each other using the UML Specialization/Generalization relation. The illustrated example related to the class performance_assessment_request_type in the information model for the interface between a Combat Management System (CMS) and a radar. It is within the capability of the skilled person to create similar models for other specific types of middleware components.

Returning to FIG. 3, at step 304 middleware models are generated. This can involve the tool 202 receiving the model 206 as input and, in conjunction with the Enterprise Architect functionality, and, in some cases, the add-in(s) 214, process the model to produce a bridge component model and a middleware interface model. The bridge component model is a UML class model of the bridge software code to be generated. The middleware interface model is a UML class model of the interface between the software components as implemented by that particular middleware. In the example of DDS it is a model of the IDL (Interface Definition Language) specification for the interface. In the specific example, a test harness model is also created.

At step 306, source code files for the middleware bridge 210 are generated. This can involve the tool 202 using the models generated at step 304 as input and, in conjunction with the Enterprise Architect functionality, and, in some cases, the add-in(s) 214, process the models to generate bridge component source code, as well as middleware specific interface specifications. The tool 202 can generate the source code for a respective bridge software program 210 for each Service. The tool for this can consist of a set of templates that are instantiated with each Service package from the UML model, the Service Entities contained within it and the other supporting classes with their relationships. In the specific example the templates can contain code to:
- define CI table row type definitions (Ada source code)
- define DDS topic type definitions (Interface Definition Language—OMG's Interface Definition Language)
- create and register the CI and DDS entities with their respective middleware
- read DDS topic instances when they become available, translate the topic type instances into the corresponding table row type instances and create a table row in the CI table read CI table row instances when they become available, translate the table row type instances into the corresponding topic type instances and create a DDS topic instance disconnect the bridge from the CI and DDS middleware systems When the tool 202 is run within the Enterprise Architect modelling tool 204, the template placeholders and functions are replaced and evaluated with information from each Service in the reference model. The template capability can be extended by the at least one Add-In 214 that can provide specialist functions that encapsulate particular generation logic for the required code. The library software 212 can abstract aspects of the middleware bridge component that are independent of the definition of particular Services, thus the templates can be smaller and easier to manage. The specialist Add-In functions can extend the capability of EA's template macros to, for example:

Support list iteration

Traverse Package and Class Hierarchies and manipulate qualified names

Generate project files for Microsoft Visual Studio and Eclipse Integrated Development Environments Retrieve model information by Globally Unique Identifier (GUID)

Access environment variables

Increment integer values

Recursively find tag values

Traverse Class/Package dependencies

Support regular expressions

Manipulate the text case formatting of strings

The library software 212 can abstract from the templates functionality, such as:

Base data-type conversion and manipulation

Common routines for accessing data in the CI and DDS middleware systems

Reading quality of services values from an xml configuration file

Thread shell for writing to the CI middleware

In addition to the source code for the bridge component and associated type definitions, the specific example tool 202 can also generate one or more of the following:

Java source code 216A for a DDS test-harness with an interactive GUI an Ada source code interface 216B to the CI tables and Ada type definitions Visual Studio project files 216C for each of the bridges Eclipse project files for each of the test-harnesses Configuration files 216D for the CI entities to be created and registered At step 308 executable middleware bridges and test harnesses are built. This can involve the tool 202 receiving the code generated at step 306 as input and, in conjunction with the Enterprise Architect functionality, and, in some cases, the library software 212, process the code to produce executable code, which can be done using any suitable programming language(s), data structure(s), compiler(s), etc. The code can be executed locally or remotely to enable communication between the software components.

The invention claimed is:

1. A computer-implemented method of facilitating communication between a first software component and a second software component, the method including:

receiving data representing an information model of a first middleware component associated with the first software component and a second middleware component associated with the second software component, the information model data defining logical information to be communicated, via a middleware bridge component, between the first middleware component and the second middleware component;

receiving data representing a middleware interface model defining classes of services between the first middleware component and the first software component, and further defining classes of services between the second middleware component and the second software component;

automatically generating, using the information model data independently from and exclusive of the middleware interface model data, bridge source code for building the middleware bridge component, the bridge source code including instructions that when executed provide communication of the logical information between the first middleware component and the second middleware component independently of the classes of services; and building an executable middleware bridge component using the bridge source code and further using the middleware interface model data, the executable middleware bridge component being configured to communicate information between the first software component and the second software component via the first and second middleware components, respectively.

2. The method according to claim 1, wherein the middleware interface model data comprises the classes of services used by the middleware component stereotyped as Service Entities.

3. The method according to claim 2, wherein the middleware interface model data further comprises other classes of services packaged into Services.

4. The method according to claim 3, wherein a said Service Entity defines primary atomic information that is communicated by a said Service.

5. The method according to claim 4, wherein the middleware interface model data is used to build the executable middleware bridge component for each said Service of the middleware interface model, wherein the middleware bridge component is configured to receive entities defined for the first middleware component and performs format and protocol conversion on the entities to create corresponding entities suitable for use by the second middleware component.

6. The method according to claim 5, further including generating code including instructions that when executed provide for entry to and exit from the first middleware component and the second middleware component.

7. The method according to claim 3, including replacing and evaluating template placeholders and functions with information from each said Service in the middleware interface model data.

8. The method according to claim 3, including using at least one software add-in for providing specialist functions that encapsulate particular generation logic for generating the bridge source code.

9. The method according to claim 3, including abstracting aspects of the middleware bridge component that are independent of the Services.

10. The method according to claim 1, wherein the information model data is based on UML syntax.

11. The method according to claim 5, wherein the first middleware component comprises Common Infrastructure used in a Combat Management System and the second middleware component comprises Data Distribution Service™.

12. The method according to claim 11, wherein the first software component that uses the first middleware component comprises a Combat Management System, and wherein the second software component that uses the second middleware component comprises a Combat System Helper Function.

13. A computer program product comprising one or more non-transitory machine readable mediums encoded with instructions that when executed by one or more processors cause a process to be carried out for facilitating communication between a first software component and a second software component, the process including:
receiving data representing an information model of a first middleware component associated with the first software component and a second middleware component associated with the second software component, the information model data defining logical information to be communicated, via a middleware bridge component, between the first middleware component and the second middleware component;
receiving data representing a middleware interface model defining classes of services between the first middleware component and the first software component, and further defining classes of services between the second middleware component and the second software component;
automatically generating, using the information model data independently from and exclusive of the middleware interface model data, bridge source code for building the middleware bridge component, the bridge source code including instructions that when executed provide communication of the logical information between the first middleware component and the second middleware component independently of the classes of services; and
building an executable middleware bridge component using the bridge source code and further using the middleware interface model data, the executable middleware bridge component being configured to communicate information between the first software component and the second software component via the first and second middleware components, respectively.

14. Apparatus including the one or more processors and the computer program product of claim 13.

15. The computer program product of claim 13, wherein the middleware interface model data comprises the classes of services used by the middleware component stereotyped as Service Entities, and wherein the middleware interface model data further comprises other classes of services packaged into Services, and wherein a said Service Entity defines primary atomic information that is communicated by a said Service.

16. The computer program product of claim 15, the process further including replacing and evaluating template placeholders and functions with information from each said Service in the information model data.

17. The computer program product of claim 15, the process further including using at least one software add-in for providing specialist functions that encapsulate particular generation logic for generating the bridge source code.

18. The computer program product of claim 15, the process further including abstracting aspects of the middleware bridge component that are independent of the Services.

19. The computer program product of claim 15, wherein the middleware interface model data is used to build the executable middleware bridge component for each said Service of the middleware interface model, and wherein the middleware bridge component is configured to receive entities defined for the first middleware component and performs format and protocol conversion on the entities to create corresponding entities suitable for use by the second middleware component, and the process further includes generating code including instructions that when executed provide for entry to and exit from the first mentioned middleware component and the second middleware component.

20. The computer program product of claim 15, wherein the first middleware component comprises Common Infrastructure used in a Combat Management System and the second middleware component comprises Data Distribution Service™, and wherein the software component that uses the first middleware component comprises a Combat Management System and the second software component that uses the second middleware component comprises a Combat System Helper Function.

* * * * *